US008250107B2

(12) United States Patent
Anderson (10) Patent No.: US 8,250,107 B2
(45) Date of Patent: Aug. 21, 2012

(54) TECHNIQUES FOR GRAPH DATA STRUCTURE MANAGEMENT

(75) Inventor: Eric Anderson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1778 days.

(21) Appl. No.: 10/454,252

(22) Filed: Jun. 3, 2003

(65) Prior Publication Data
US 2004/0249781 A1    Dec. 9, 2004

(51) Int. Cl.
G06F 7/00       (2006.01)
G06F 17/30     (2006.01)

(52) U.S. Cl. .................................. 707/798; 707/679

(58) Field of Classification Search ............ 707/1, 4, 707/102, 798, 679; 382/228
See application file for complete search history.

(56) References Cited

U.S. PATENT DOCUMENTS

| | | | | |
|---|---|---|---|---|
| 5,701,456 | A * | 12/1997 | Jacopi et al. ................... | 707/4 |
| 5,768,423 | A * | 6/1998 | Aref et al. ..................... | 382/228 |
| 5,848,416 | A | 12/1998 | Tikkanen | |
| 6,049,810 | A * | 4/2000 | Schwartz et al. ............. | 707/206 |
| 6,560,610 | B1 | 5/2003 | Eatherton et al. | |
| 6,615,216 | B1 * | 9/2003 | Hu ................................ | 707/101 |
| 6,732,114 | B1 * | 5/2004 | Aamodt et al. ............... | 715/243 |
| 6,952,701 | B2 | 10/2005 | Anderson | |
| 2001/0047361 | A1 * | 11/2001 | Martin et al. ............. | 707/103 R |

OTHER PUBLICATIONS

"Design Patterns for the Implementation of Graph Algorithms", By: Dietmar Kuhl, Published 1996 http://www.dietmar-kuehl.de/generic-graph-algorithms.pdf.*

Mathew L. Ginsberg, James M. Crawford, David W. Etherington, Dynamic Backtracking, CIRL, University of Oregon, Eugene, 1996. < ftp://ftp.cirl.uoregon.edu/pub/users/ginsberg/papers/dynamic.ps.gz>.

George W. Furnas, Jeff Zacks, Multitrees: Enriching and Reusing Hierarchical Structure, Human factors in computing systems: CHI '94 conference proceedings: "celebrating interdependence": Boston, Massachusetts, USA, Apr. 24-28, 1994, pp. 330-336, ACM Press, New York.

Eric Anderson, Mahesh Kallahalla, Susan Spence, Ram Swaminathan, Qian Wang, Ergastulum: Quickly Finding Near-Optimal Storage System Designs, SSP technical report HPL-SSP-2001-05. HP Laboratories, Palo Alto, Jun. 5, 2002. < http://www.hpl.hp.com/research/ssp//papers/ergastulum-paper.pdf>.

U.S. Appl. No. 09/924,735, filed Feb. 13, 2003, Anderson.

* cited by examiner

*Primary Examiner* — Apu Mofiz
*Assistant Examiner* — Chelcie Daye (57) ABSTRACT

Techniques for graph data structure management. In one aspect, a data structure includes a plurality of nodes connected by edges. A node of the data structure includes a current set of variables for defining a state of the node and at least one last-in, first-out stack for storing pointers to prior sets of variables for the node. The state of the node may be saved by adding a pointer to at least one of the stacks at the node. The state of the node may be restored by removing the pointer from the stack and restoring the node variables to those indicated by the pointer. A first counter associated with a stack at the node may store a number of pending saves at the node, while a second counter may store a number of saves to be propagated to descendents of the node. A state of the data structure may be saved by traversing other nodes of the data structure and adding pointers or incrementing counters at the nodes.

20 Claims, 8 Drawing Sheets

TECHNIQUES FOR GRAPH DATA STRUCTURE MANAGEMENT

FIELD OF THE INVENTION

The present invention relates to the field of graph data structures. More particularly, the present invention relates to techniques for management of graph data structures.

BACKGROUND OF THE INVENTION

A graph is a type of data structure in which pairs of vertices (also referred to as nodes) are connected by edges. Typically, the nodes in a graph each represent an element in a set, while the edges represent relationships among the elements. Thus, graphs tend to be a useful way of representing a variety of types of information.

A directed graph is one in which the edges have a direction. A tree is a type of directed graph data structure having a root node, and a number of additional nodes that are each either an internal node or a leaf node. The root node and internal nodes each have one or more "child" nodes and each is referred to as the "parent" of its child nodes. Leaf nodes do not have any child nodes. Edges in a tree are conventionally directed from parent to child. In a tree, nodes have exactly one parent. A generalization of trees, known as a directed acyclic graph (DAG), allows a node to have multiple parents, but does not allow the edges to form cycle. Thus, trees and DAGs tend to be useful for representing hierarchical information.

A design problem may be represented as a data structure, such as a tree, in which variables are associated with nodes of the data structure and the edges represent relationships among the nodes. Searching through a space of possible solutions to a design problem involves traversing the data structure and manipulating the variables in an attempt to find a state of the variables that represents a successful solution. If a change to a variable does not result in a successful solution, backtracking can be employed in which the change is undone and a different change is attempted. Undoing a change may require reversing the manipulations for a number of variables which depended upon the changed variable and, thus, may require backtracking over portions of the data structure. Where the data structure is a tree, this may require backtracking over multiple levels of the tree.

During a search, it may be necessary to backtrack repeatedly over portions of the data structure. Further, when a solution is found, it may be desired to locate other, more-optimal solutions. As a result, it may be necessary to save prior states of the data structure for future reference. Further, saving and retrieving many versions of the data structure can be cumbersome, particularly where each state of the data structure represents a large quantity of data.

Therefore, what is needed are improved techniques for managing graph data structures and, more particularly, for storing and retrieving state information for a graph data structure. It is toward these ends that the present invention is directed.

SUMMARY OF THE INVENTION

The present invention provides improved techniques for managing graph data structures. In one aspect, a data structure includes a plurality of nodes. A node of the data structure includes a current set of variables for defining a state of the node and at least one last-in, first-out stack for storing pointers to prior sets of variables for the node. The state of the node may be saved by forming a duplicate of the variables for the node and adding a pointer to the duplicate to at least one of the stacks at the node. The state of the node may be restored by removing the pointer from the stack and restoring the node variables to those indicated by the pointer. The state of the node may be discarded by removing the pointer from the stack and discarding the pointer.

A first counter associated with a stack at the node may be incremented to save the state of a node wherein the first counter stores a number of pending saves at the node. The state of the node may be restored by decrementing the first counter for the stack if it is non-zero and, otherwise, removing a pointer from the stack and restoring the node variables to those indicated by the pointer. The state of the node may be discarded by decrementing the first counter for the stack if it is non-zero and, otherwise, removing a pointer from the stack and discarding the pointer. The pending saves may be instantiated by forming a duplicate of the node variables and adding a number of pointers to the duplicate to the stack wherein the number of pointers corresponds to the number of pending saves. The number of pending saves may then be set to zero.

The states of nodes of the data structure define the state of the data structure. A state of at least a portion of the data structure may be saved by traversing nodes of the data structure and, at each node, adding a pointer to at least one stack at the node or by traversing each node of the data structure and, at each node, incrementing a first counter for a stack at the node. The state of at least a portion of the data structure may be restored by traversing nodes in the data structure and, at each node, decrementing the first counter for a stack is if it is non-zero and, otherwise, removing a pointer from the stack and restoring the node variables to those indicated by the pointer. A state may be discarded by decrementing the appropriate counter.

Alternately, to save the state of at least a portion of the data structure having directed edges, a second counter associated with a stack at the node may be incremented wherein the second counter stores a number of saves to be propagated to descendents of the node. Saves may be propagated to descendents of the node by incrementing a second counter for the stack at a next generation of descendents of the node and decrementing the second counter for the stack at the node. Saves may be propagated to descendents of the node prior to changing variables of a descendent node in the data structure. The state of the portion of the data structure may be restored by decrementing the second counter for the stack and may be discarded by decrementing the second counter for the stack.

These and other aspects of the invention are described in more detail herein.

DETAILED DESCRIPTION OF A PREFERRED EMBODIMENT

The present invention provides improved techniques for managing graph data structures. Techniques are provided for traversing the data structure, saving the state of a node and for restoring the node to a prior saved state. A state for a node is a collection of values for variables associated with the node. A state for the data structure is a collection of node states. Preferably, saved states of the data structure are associated with one or more identifiers, also referred to as names. When it is desired to restore the data structure to a prior named state, each node is restored to a state associated with the name.

A save node state operation is provided that saves a copy of node variables. A restore node state operation obtains a saved copy of the node variables generated by the save node state operation at that node and restores them to the node. A last-in, first-out stack for each node may be associated with each named state for the data structure. A save state operation for the data structure involves traversing the data structure and at each node, the save node state operation is called and the variables (or a pointer thereto) for the state are pushed onto the named stack. A restore state operation for the data structure involves traversing the data structure and at each node, the restore node state operation is called using variables (or a pointer thereto) popped off of the named stack.

Storage space may be conserved by avoiding saving multiple copies of the entire data structure. Rather, a first counter associated with each named stack at the node may be incremented until the state of the node is to change. When the state is to be restored, if the counter is non-zero, it may be decremented. When the state of the node is to be changed, an instantiate operation inserts pointers to the named stacks where the number of pointers corresponds to the value of the pointer for the stack. Each pointer points to the same copy of the saved variables. This avoids the need to store multiple copies of the node state variables.

In addition, until a portion of the data structure is to be changed, save operations for the portion may be tracked by use of a second counter at each node that is associated with each named state. This second counter indicates the number of save operations to be propagated to descendents within the data structure. The counter is incremented for each save operation and decremented for each restore operation. When the state of the portion of the data structure (e.g., a node) is to be changed, the instantiate operation is called, which instantiates the saves represented by the second counter at all ancestors of the node to be changed. This is accomplished by propagating the value of the second counter from each ancestor node to its immediate children until the node to be changed is reached. Thus, the saves are instantiated along a path that includes a node whose variables are to be changed. This provides for a "lazy" traversal of the data structure, in which portions of the data structure having nodes whose state is unchanged need not be traversed for performing save and restore operations.

While specific examples are described herein in the context of tree data structures, the present invention may be used for manipulating many different data structures including trees, directed asynchronous graphs in which a child node has two or more parents, cyclic graphs and vector representations. Further, for some data structures the edges are generally explicitly included in the data structure, whereas in other data structures, such as a balanced tree data structure (sometimes referred to as a heap), the edges may be implicit; the invention may be applied in either case. When a data structure is provided in the form of a one-dimensional vector representation, the vector may be represented as a two-level tree structure by the addition of a root node with edges connecting the root node to portions of the vector representation. Where a data structure is provided in the form of a multi-dimensional vector representation, a multiple-level tree structure may be formed by assigning portions of the vector representation to nodes in the tree structure. Where elements of the vector are expected to be changed together, such elements of the vector may be arranged in groups which are each assigned into a different child node in the tree structure.

Further, state information for the data structure may represent any of a number of different types of data, including design problems. In a particular example, the present invention may be used for solving design problems associated with storage systems, an example of which is described in U.S. application Ser. No. 09/924,735, entitled, "Simultaneous Array Configuration and Store Assignment for a Data Storage System," now U.S. Pat. No. 6,952,701, the contents of which are hereby incorporated by reference.

In sum, U.S. application Ser. No. 09/924,735 describes use of a data structure for storage system design problems. At least some of the nodes of the data structure correspond to physical data storage devices having respective attributes. A plurality of data stores each having data storage requirements, such as capacity and bandwidth requirements, are provided as input. The data stores are assigned recursively into the data structure, checking at each node that none of the attributes are exceeded by the requirements of the store. While the stores are assigned, the data structure may be modified to better accommodate the stores. The possible assignments which do not violate any attributes are compared to each other according to the goals of the system.

Figure 1:
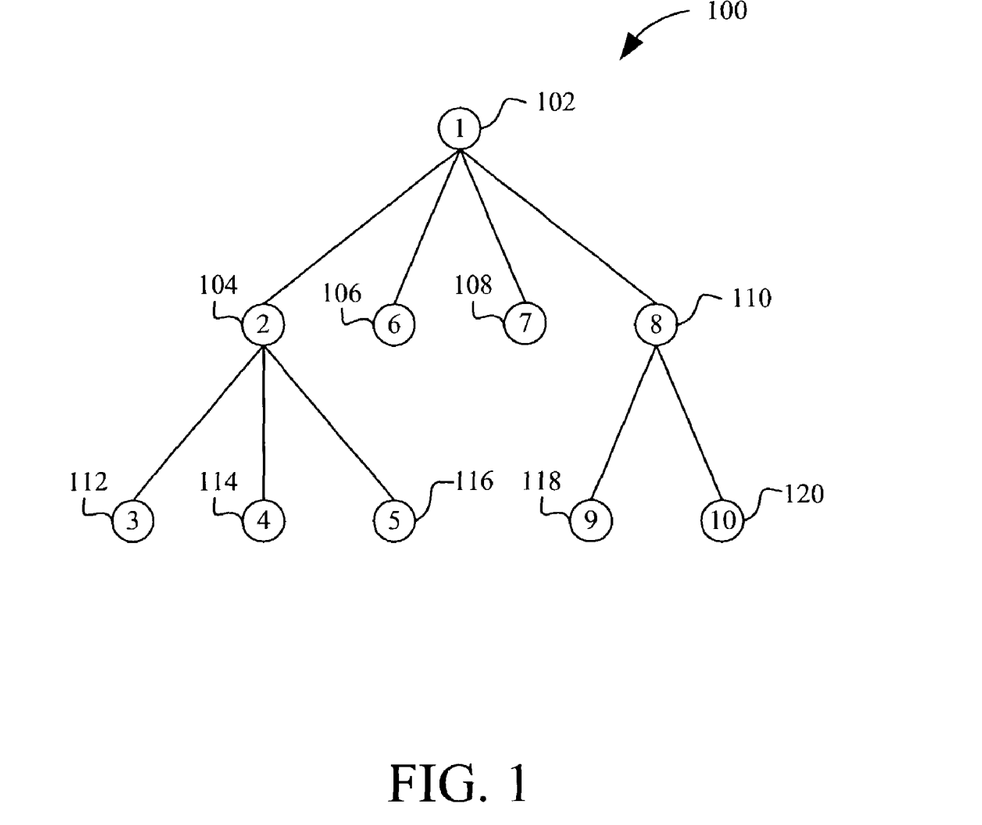
FIG. 1 illustrates an exemplary data structure by which the present invention may be implemented.

FIG. 1 illustrates an exemplary data structure 100 by which the present invention may be implemented. As shown in FIG. 1, the data structure 100 is in the form of a tree having a plurality of nodes interconnected by edges directed from a parent node to its child nodes. A root node 102 has child nodes 104-110. Child node 104 is also an intermediate node because it has child nodes 112-116, as is child node 110 because it has child nodes 118 and 120. The tree 100 may itself be stored in computer memory as a data structure which is preferably hierarchical, though other data structures may be used, such as a list structure or "flattened" tree structure. Further, the data structure can change as it is being manipulated; for example, the number of nodes and the relationships among them may change. The relationships among nodes (e.g., the identities of the child nodes of a node) may be included in the node variables.

Figure 2:
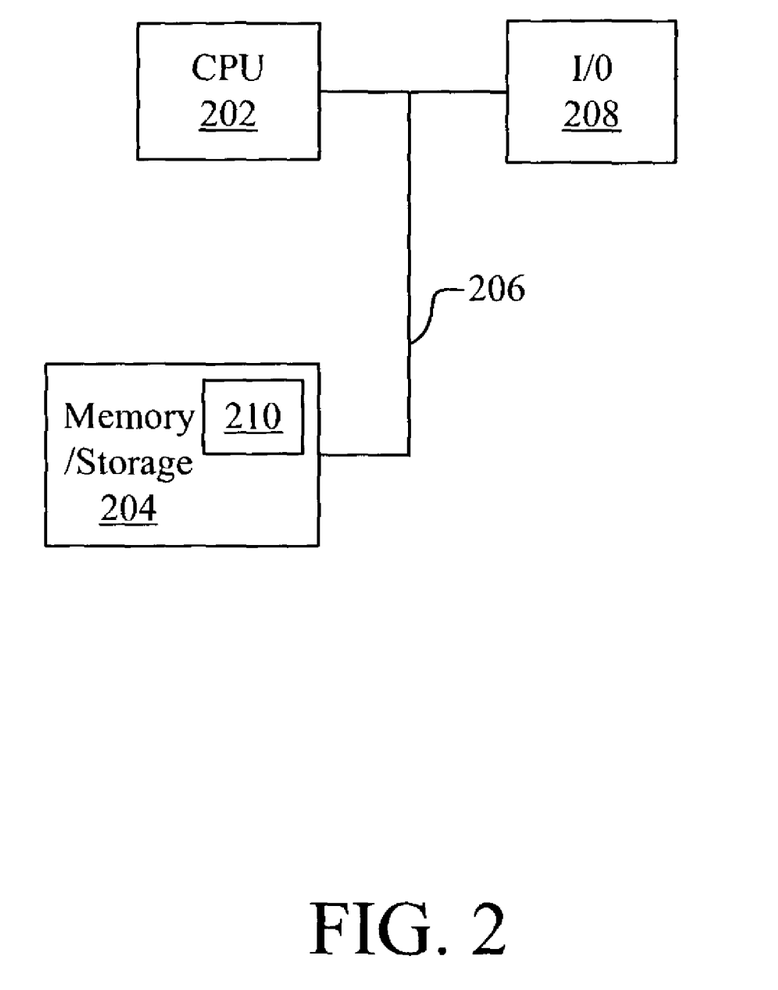
FIG. 2 illustrates a general-purpose computer system by which the present invention may be implemented.

FIG. 2 illustrates a block schematic diagram of a general-purpose computer system 200 in which the device tree data structure 100 of FIG. 1 may be stored and manipulated in accordance with the present invention. The computer system 200 may include a general-purpose processor 202, a memory 204, such as persistent memory (e.g., a hard disk for program memory) and transitory memory (e.g., RAM for storing the data structure 100), a communication bus 206, and input/output devices 208, such as a keyboard, monitor and mouse. The computer system 200 is conventional. As such, it will be apparent that the system 200 may include more or fewer elements than shown in FIG. 2 and that other elements may be substituted for those illustrated in FIG. 2. One or more software programs 210 may be stored in the memory 204 for manipulating the data structure 100 in accordance with the present invention.

As an example of manipulation of the data structure 100, a software routine may be provided by which each node identifies or "discovers" each of its child nodes. This node discovery routine allows an entire data structure to be traversed. For example, calling the routine at the root node 102 discovers the child node 104. Then, calling the routine at the child node 104 discovers its child nodes 112, 114 and 116. Once all of the descendents of the node 104 are exhausted, the next child of the root node 102 is discovered. Because it has no descendents, the next node to be discovered is the node 108 and then the node 110. The descendents 118 and 120 of the node 110 are next discovered by calling the routine at the node 110. In this manner, the entire data structure may be traversed in the order shown by the numerals 1-10 in FIG. 1. While a depth-first search has been described, it will be apparent that a different data structure traversal algorithm may be employed using the same or a different node discovery routine.

Figure 3:
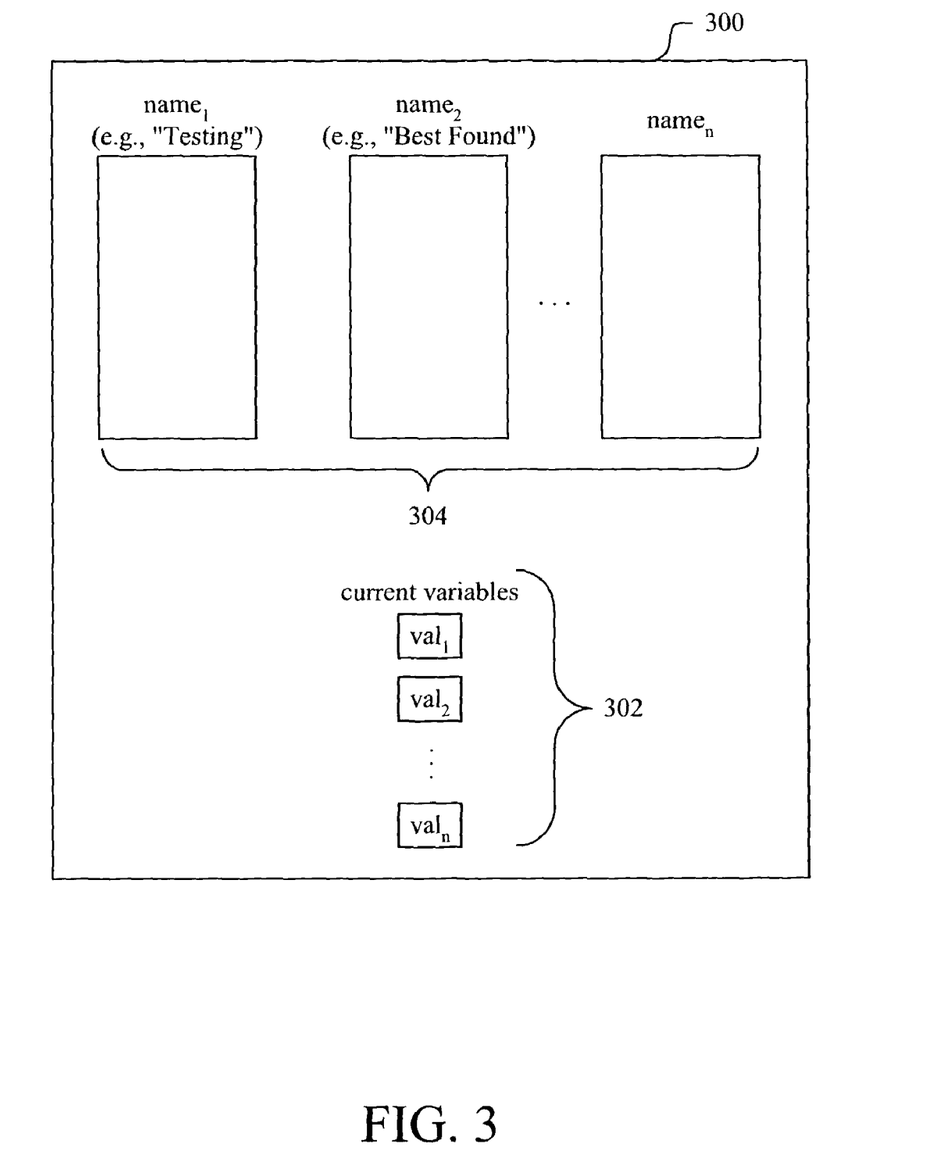
FIG. 3 illustrates an exemplary node of the data structure of FIG. 1.

FIG. 3 illustrates an exemplary node 300 of the data structure 100 of FIG. 1. As shown in FIG. 3, the node 300 includes a current set of one or more variables (which may also be referred to as attributes) 302 and one or more last-in, first-out data stacks 304. The variables 302 indicate the current state of the node 300. For example, where the node 300 represents a data storage device, the variables 302 may indicate the configuration of the device (e.g., number of disk drives and their capacities) and may also identify data stores assigned to the device. The number of variables n at the nodes need not be fixed for all nodes or even a single node as it may change based on manipulations of the node.

The stacks 304 are optionally named, e.g., $name_1$, $name_2$ and $name_n$, and are used to store and track prior states of the node. For example, one of the stacks 304 at each node may be used to store node states under current investigation. In this case, an example name may be "Testing." Thus, at each node, the "Testing" stack may be used for states of the data structure 100 that are under current investigation in an attempt to identify a design problem solution that does not violate any constraints on the design. A different one of the stacks 304 may be used to store possible design solutions that have previously been identified as not violating any design constraints. In this case, an example name may be "Best Found." Thus, at each node, the "Best Found" stack may be used for states that do not violate any design constraint. A most-optimal one of the states saved in the Best Found stack may eventually be selected for the design. While alpha numeric names may be assigned to the stacks 304, these names may be mapped small numbers (e.g., zero, one, two, etc.) before a graph traversal for access efficiency.

To save a current state of the data structure 100, the save state routine may be called for a specified name (e.g., "Testing"). During this routine, the data structure 100 is traversed, as described above, and at each node, the save node state operation is called and the current set of variables 302 are pushed onto the Testing stack. Rather than storing the variables in the Testing stack, they may instead be stored elsewhere (e.g., the memory 204 of FIG. 2) and a pointer to their location may be pushed onto the Testing stack.

To restore the state of the data structure 100 to a prior state, the restore state operation may be called for a specified name (e.g., "Testing"). During this routine, the data structure 100 is traversed, and at each node, the restore node state operation is called. The restore node state operation pops the last entry (e.g., a pointer) off of the Testing stack. The node variables are then restored to those identified by the pointer.

Changes may be made to one or more variables 302 at various different nodes in the data structure 100. As the changes are being made and evaluated, various states of the data structure 100 may be saved by calling the save state routine and restored by calling the restore state routine. Typically, in searching for a design problem solution, a state of the data structure 100 is saved, a transform to the data structure 100 is made and evaluated, and, then, the transform is either adopted or rejected (and the prior state restored) based on the evaluation. These steps can be nested by which a transform and its evaluation involve the making of a further change and evaluating that further change. A nested search may thus require saving a number of states under the same name (e.g., "Testing"). If a transform is rejected, it may be desired to backtrack a number of prior states to restore the data structure 100 to a condition in which a different transform may be explored.

Rather than restore the data structure to each prior state while backtracking, states which are not expected to be needed again may be discarded. To discard a state, a discard state routine may be called for a specified name. The discard state routine includes traversing the data structure 100 and, at each node, a discard node state routine is performed in which the last pointer on the named stack is popped off and discarded.

Thus, by performing the above-described operations, states of the data structure 100 may be saved, restored and discarded.

Figure 4:
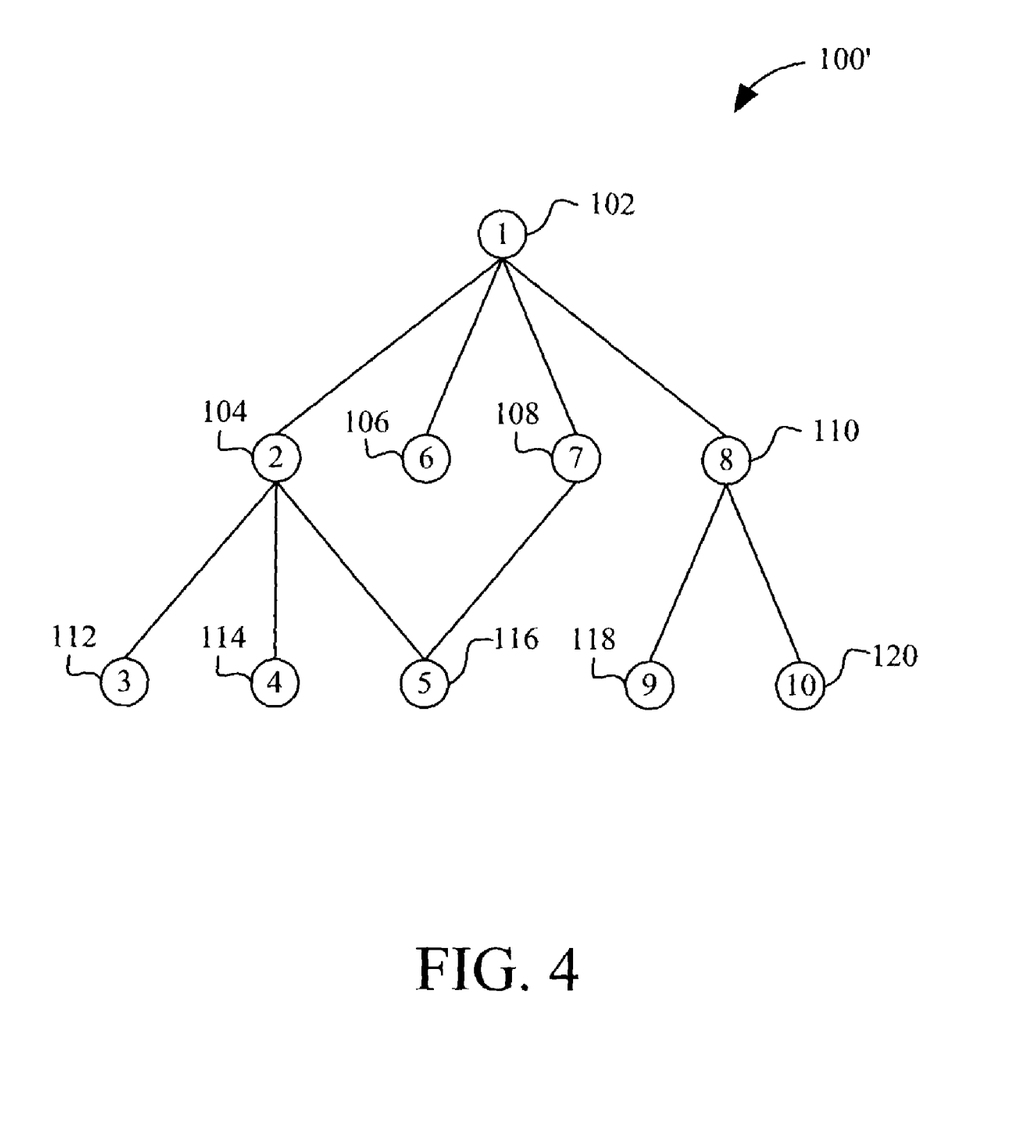
FIG. 4 illustrates an alternate exemplary data structure by which the present invention may be implemented.

FIG. 4 illustrates an exemplary data structure 100' that is similar to the data structure of FIG. 1 except that node 116 has two parent nodes 104 and 108. The discover nodes routine described above for traversing a data structure would tend to "discover" the node 116 twice, once when the routine is called at the node 104 and a second time when the routine is called at the node 108. As a result, the save state routine would tend to be performed twice at the node which could result in a redundant entry being added to one of the stacks 304 at the node 116. Similarly, the restore state routine or the discard state routine would tend to remove one too many entries from the stacks 304.

Figure 5:
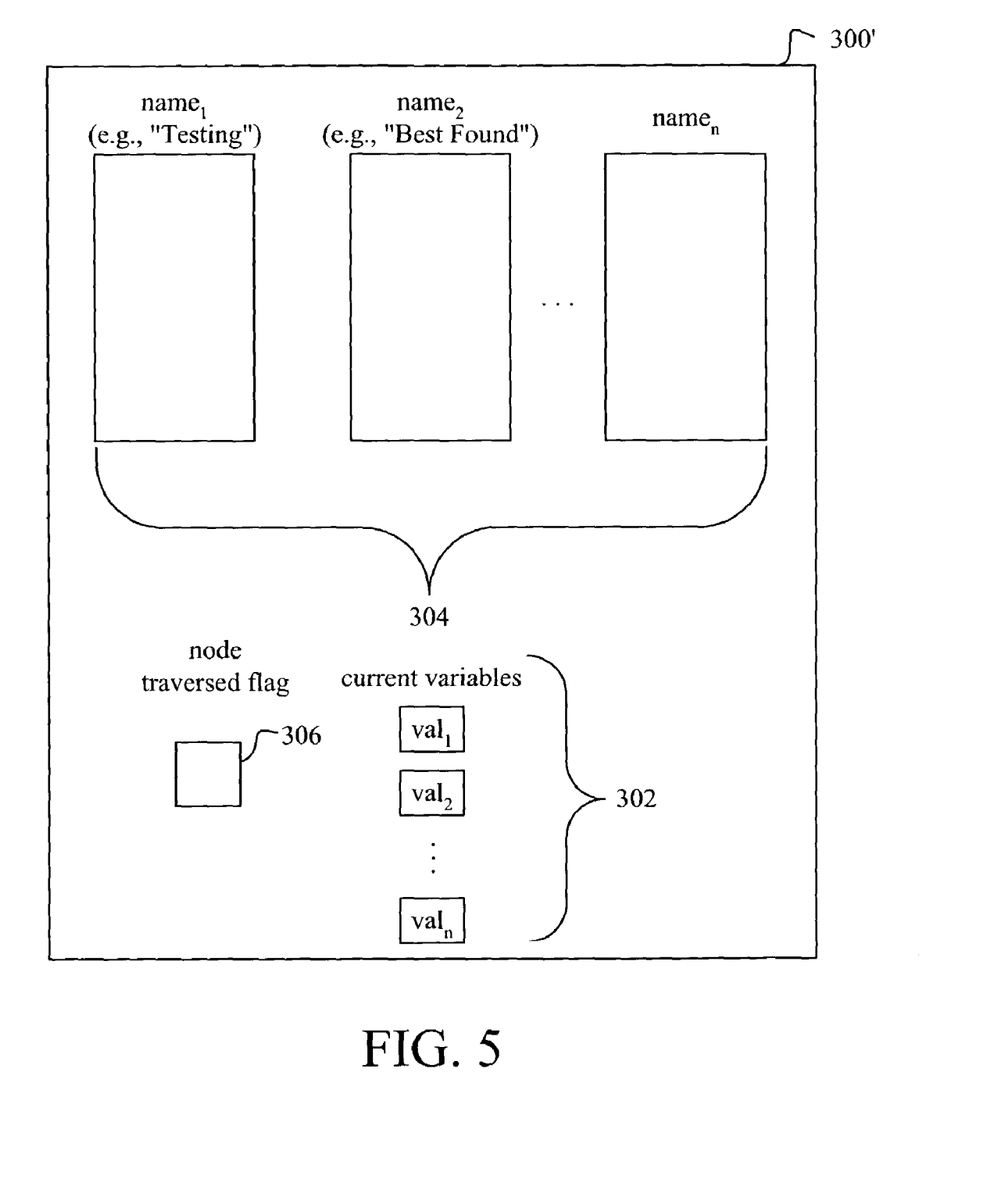
FIG. 5 illustrates an exemplary node of the data structure of FIG. 4.

Thus, in accordance with one aspect of the present invention, each node is provided with an indicator of whether the node has been traversed in connection with an operation in which the data structure 100' is traversed. For example, each node may be provided with a flag 306 (FIG. 5). FIG. 5 illustrates an exemplary node 300' including a flag 306 which may be used in the data structure 100' of FIG. 4. The flag 306 at each node may be set to false prior to calling the save state routine, the restore state routine or the discard state routine. Then, when a node is traversed, its flag 306 is checked. If the flag 306 is set to false, the save node state, restore node state or discard node state operation is performed for the node and, otherwise, if the flag 306 is set to true, the routine is not performed again as it was already performed earlier in the traversal (i.e. the node is skipped). Once an operation has been performed at the node, the flag is set to true. The flags 306 are preferably all reset before each traversal routine is performed though they may instead be reset after each traversal routine is performed.

Alternately, the flags 306 may be replaced by a counter at each node whose value indicates whether the operation has already been performed at the node. For example, the value of a global counter may be incremented before a traversal of the data structure 100. Then, when the node is traversed, its counter value may be compared to the global counter value. If they are not equal, the operation (e.g., save, restore or discard) may be performed at the node and, then, the counter at the node may be set equal to the global counter value. If they are equal, then this indicates that the operation was already performed at the node earlier in the same traversal (i.e. the node is skipped).

In accordance with a further aspect of the invention, each node may be provided with one or more counters 308 (FIG. 6), each being associated with a particular one of the named stacks 304. When the save node state operation is called for a specified name, the counter 308 associated with the name is incremented. When the restore node state operation is called, the counter 308 associated with the name is decremented if its value is non-zero and, otherwise, if its value is zero, the last pointer is popped off of the stack and the variables are restored as the current variables 302. Further, when the discard node state operation is called, the counter 308 is decremented if its value is non-zero and, otherwise, if its value is zero, the last pointer is popped off of the stack and discarded.

Figure 6:
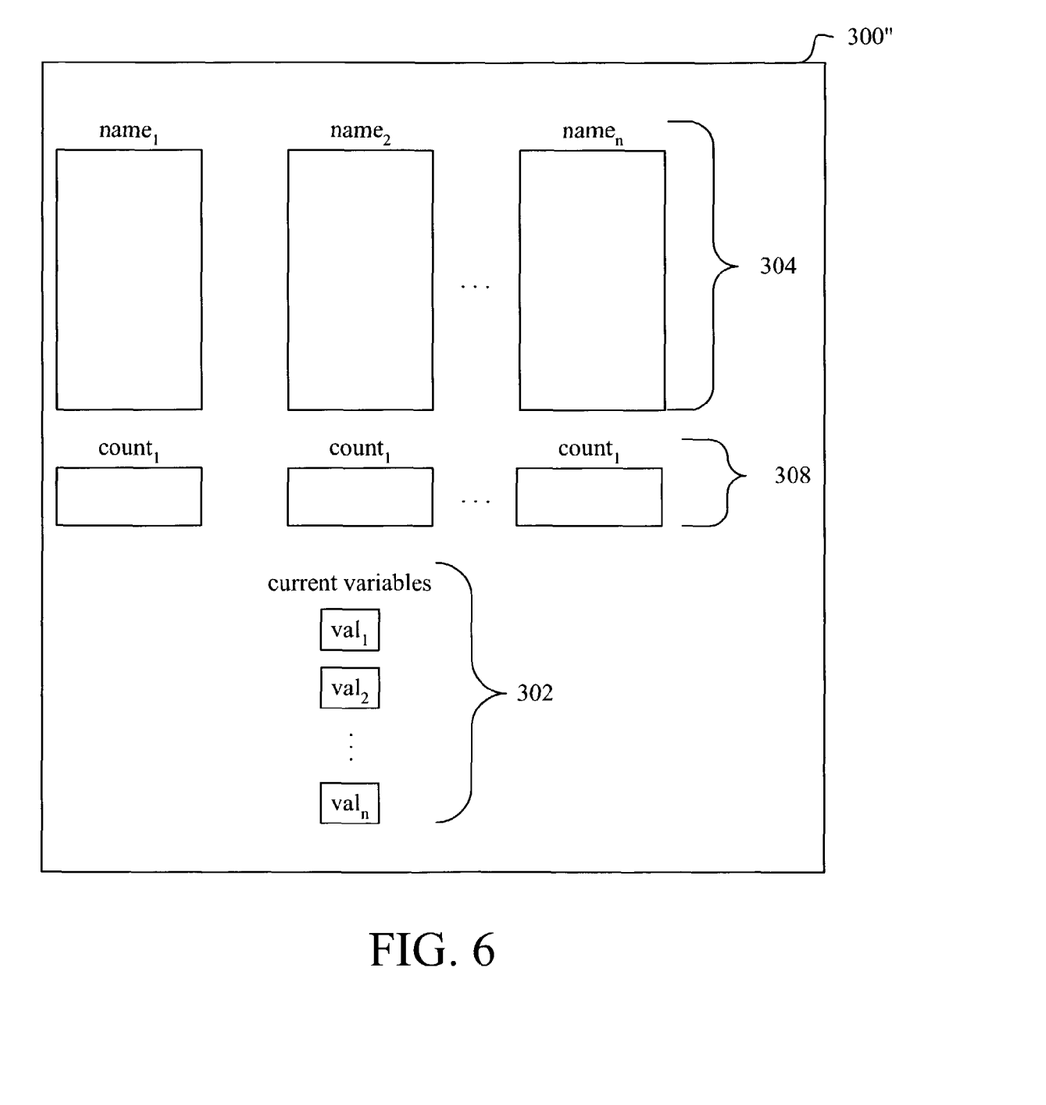
FIG. 6 illustrates a first alternate exemplary node of a data structure.

For example, a counter 308 may be provided for the "Testing" stack. When the save state routine is called for the name, Testing, the data structure 100 is traversed, as described above, and at each node, the Testing counter 308 is incremented, which may avoid duplicating the state if a restore or discard operation is called without the node being instantiated in the interim. If a restore or discard operation is called for the name, Testing, the counter 308 may be decremented. Thus, use of the counter 308 avoids having to store the same variables (or a pointer) to save unchanged node states and also avoids having to restore a node with variables that are unchanged.

The value in each of the counters 308 described above in reference to FIG. 6 may be referred to as "pending saves" because the count represents the number of times a save operation has been called at the node, but the corresponding state variables 302 (or a pointer thereto) have not yet been saved for the node having that pending saves count. Because the pending saves counter is decremented in response to restore and discard operations, these operations serve to reduce the number of pending saves.

When the state of a node is to be changed, an instantiate pending saves operation is preferably performed at the node before the changes are made. If any of the counters 308 at the node are non-zero when the instantiate operation is performed, a number of pointers to a single copy of the current set of variables 302 may be added to the named stacks, where the number of pointers corresponds to the value of the counter 308 for the corresponding stack. This avoids the need to store multiple copies of the node state variables. Instead, one copy can be saved though multiple pointers may be added to the stacks 304 to represent multiple save operations. After saving the pointers, the counters for the states are preferably set to zero.

As an example, assume that the counter for the "Testing" stack 304 has a value of three and the counter for the "Best Found" stack has a value of two. This means that the node state was unchanged for each of the five save state routines currently represented as pending saves. So that the counters 308 may be reset to zero while keeping track of these saved states of the node, a pointer to a copy of the current set of variables 302 may be inserted into the Testing stack three times and the same pointer may also be inserted onto the Best Found stack two times. Later, after the variables 302 may have been changed, future traversals for a saving the state of the data structure will increment the counter, whereas, a duplicate of the variables will only need to be formed to instantiate the saves.

Thus, memory usage is reduced by avoiding storing multiple copies of node state variables 302. In some circumstances, it may be desired to further reduce memory required to save node state variables 302 by compressing the data to be saved. This may be accomplished by using a known compression algorithm or by computing a difference between a current set of the variables 302 to be saved and prior saved set; then only the computed difference may be stored, rather than the entire set of variables 302.

In accordance with a further aspect of the invention, a node may be provided with one or more counters 310 (FIG. 7), each being associated with a particular one of the named stacks 304. When the save node state operation is called for a specified name, the counter 310 associated with the name may be incremented instead of incrementing the counter 308. Where the data structure is hierarchical (e.g., a tree), the nodes in a hierarchy below this node (a "sub-tree") may then be skipped in the save state operation.

Figure 7:
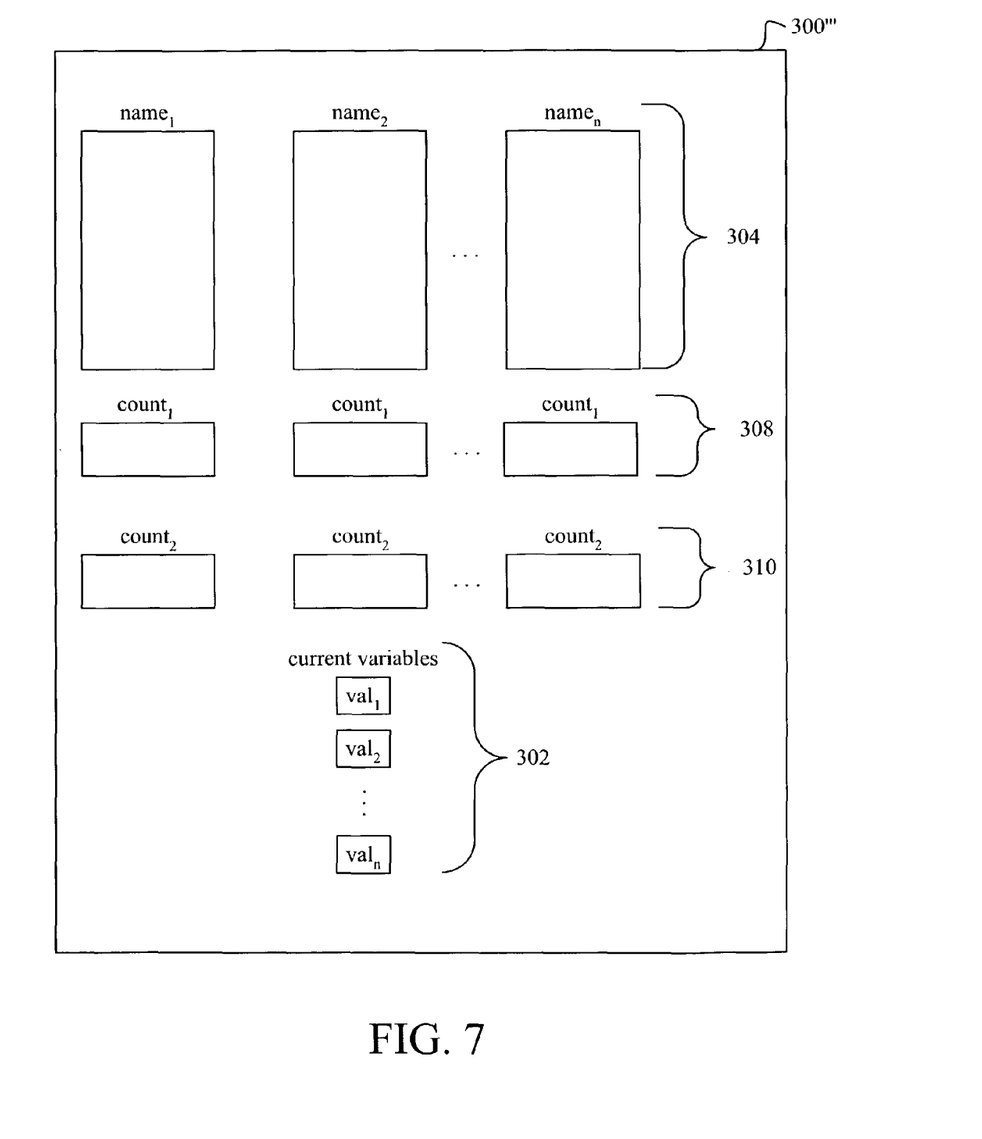
FIG. 7 illustrates a second alternate exemplary node of a data structure.

Similarly, when the restore node state operation or the discard node state operation is called, the counter 310 associated with the name is decremented if its value is non-zero. The nodes in the hierarchy below this node may then be skipped for the restore state or discard state operation. Otherwise, if the value of the named counter 310 is zero, the node behaves as described above in reference to FIG. 6. In particular, for the restore state operation, the last pointer is popped off of the named stack and the variables are restored as the current variables 302 and the levels in hierarchy below the node are traversed for the restore operation. Similarly, when the discard node state operation is called, the last pointer is popped off of the named stack and discarded and the levels in hierarchy below the node are traversed for the discard operation.

The value in each of the counters 310 described in reference to FIG. 7 may be referred to as "pushdown" saves because the count represents the number of times a save operation has been called for a node, but the corresponding state variables 302 (or a point thereto) have not otherwise been saved for any of the nodes in the sub-tree for the node having the pushdown saves count.

For example, a counter 310 may be provided for the "Testing" stack. When the save state routine is called for the name, Testing, the data structure 100 begins to be traversed, as described above. However, at the root node 102, the pushdown saves counter 310 may be incremented and the save state operation terminated. This count now represents a saved state for the entire data structure.

When the state of a node is to be changed and pushdown saves are pending for the node, an instantiate pushdown saves operation is preferably performed before the changes are made. In the example, the instantiate operation is called at the root node 102. If the pushdown saves counter 310 for a stack at the root node 102 is non-zero, the pushdown saves counter 310 is decremented and the corresponding pending saves counter 308 is incremented. In addition, the pushdown saves counter 310 associated with the corresponding stack 304 for each child node is incremented. The instantiate operation may again be called at the next level down in the data structure 100. This process may be repeated until the pushdown saves are instantiated for the node whose variables are to be changed and are also instantiated for all of its ancestor nodes. A separate verification operation may optionally be performed to verify that the instantiate operation was performed appropriately and no saves have been lost.

Thus, the instantiate pushdown saves operation need only be called for nodes in a path to the node that is to be changed. For example, referring to FIG. 1, if only the variables 302 at the node 120 are to be changed, the pushdown saves of the root node 102 will be propagated to its child nodes 104-110. However, the instantiate pushdown saves routine need not be called at the node 104 since none of its descendents are to be changed. Rather, its pushdown saves count can remain as is. The instantiate pushdown saves routine need not be called at the nodes 106 and 108 since they have no descendents. Conversely, the pushdown saves are propagated to the child nodes 118 and 120 of the node 110. Because the variables 302 at the node 120 are to be changed, pushdown saves counters 310 in the node 120 and its ancestors need to be set to zero by propagating the pushdown saves before the variables 302 are changed.

Once the pushdown saves have been appropriately instantiated, any pending saves at the node(s) whose variables 302 are to be changed may be instantiated. In the example in which the variables 302 for the node 120 are to be changed the instantiate pending saves operation may then be called at the node 120 so that its pending saves counters may be reset to zero and the appropriate number of pointers added to its stacks 304. The number of pointers depends on the values of the pending saves counters 308, as explained above.

In this way, the number of nodes that need to be traversed for the save state, restore state and discard state operations is reduced if only part of the data structure is modified. Rather than having to traverse every node for each operation, only portions of the data structure in which node variables are to be changed need be traversed.

While FIG. 7 illustrates a node having pending saves counters 308 and pushdown saves counters 310, it will be apparent that a pushdown saves counter 310 may be provided even if a pending saves counter 308 is not. In this case, instantiating the pushdown saves involves placing an appropriate number of pointers on the corresponding stack rather than incrementing a pending saves counter.

As described above, pushdown saves are propagated within a data structure by being "pushed down" to the next generation of child nodes. As mentioned in connection with FIG. 4, in some circumstances, a node may have two parent nodes. For example, in FIG. 4, the node 116 has two parent nodes 104 and 108. Propagation of pushdown saves would tend to increment the pushdown counter at the node 116 twice, once when the instantiate pushdown saves operation is called at the node 104 and a second time when the operation is called at the node 108. As a result, this could result in a redundant entry being added to the stacks 304 at the node 116.

Figure 8:
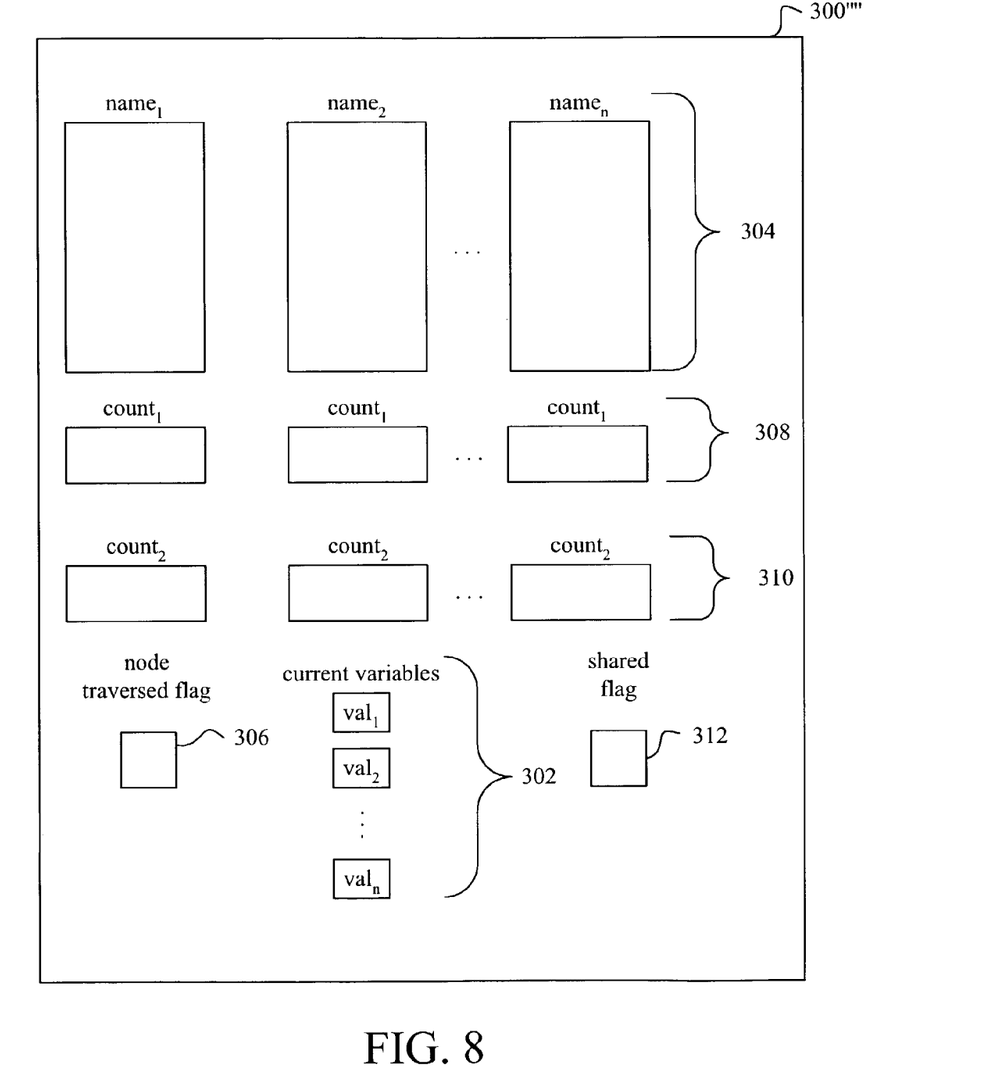
FIG. 8 illustrates a third alternate exemplary node of a data structure.

Thus, in accordance with one aspect of the invention, each node is provided with an indicator of whether descendents of the node include two or more parents of any child node. FIG. 8 illustrates a node including a shared flag indicator 312.

When the shared flag 312 for a node is set to "true," pushdown saves are not propagated to child nodes during the instantiate pushdown saves operation. Rather, the sub-tree for the node is traversed and appropriate pending saves counters 308 at all of the descendent nodes are incremented. Otherwise, if the shared flag 312 is set to false, then pushdown saves may be propagated as described above.

In the example of FIG. 4, the shared flag 312 would be set to true for the root node 102 because its descendents include two or more parents (i.e. nodes 104 and 108) of the child node 116. The shared flag for the remaining nodes would be set to false since node of their descendents include the two parent nodes 104 and 108. Thus, in the example of FIG. 4, pushdown saves would only be propagated if a sub-part of the data structure 100 below node 102 was saved (e.g., a save data structure state starting at node 104 could use pushdown saves). In other examples, a larger data structure may include one or more nodes other than a root node whose shared flag is set. In this case, pushdown saves may be propagated for some portions of the data structure, but not for others. Thus, some advantages of the pushdown saves techniques described herein may be obtained for such structures.

Note that as described above in connection with FIG. 5, nodes with more than one parent may include a node traversed flag 306 that is set to "true" when the node has been traversed in connection with a save state, restore state or discard state operations. Thus, in the example of FIG. 4, where the node 102 has its shared flag 312 set to "true," the node traversed flag 306 of the node 116 may be used to avoid performing duplicate operations at the node 116.

Alternately to employing a "shared" flag, the flag 312 may be implemented as an "unshared" flag that, when set, indicates that all children of this node are only reachable through this node. For example, this flag may be set for the node 110 in FIG. 4. When a set unshared flag is encountered during propagation of pushdown saves, this indicates that it is sufficient to increment the appropriate pushdown saves counter 310 at that node without propagating the saves to further descendents. If only the unshared flag is used, then the pushdown instantiate routine may assume that nodes are shared unless it finds a set unshared flag. Both a "shared" and "unshared" flag may be provided at each node at the same time.

While the foregoing has been with reference to particular embodiments of the invention, it will be appreciated by those skilled in the art that changes in these embodiments may be made without departing from the principles and spirit of the invention, the scope of which is defined by the following claims.

What is claimed is:

1. A memory for storing data for access by a program being executed on a data processing system, comprising a data structure stored in said memory, said data structure having a plurality of nodes, the nodes representing elements in a set and edges between the nodes representing relationships among the elements, wherein each node includes: a current set of variables that define a state of the node; and at least one last-in, first-out stack that stores one or more pointers to prior sets of variables for the node, and wherein the states of the nodes define a state of the data structure which represents a design solution of a physical system, wherein each node further comprises a first counter associated with each stack, wherein the first counter stores a number of pending state saves at the node; and wherein at least some of the nodes have descendent nodes and include a second counter associated with each stack, wherein the second counter stores a number of state saves to be propagated to descendent nodes of the node.

2. The memory according to claim 1, wherein the pending state saves are instantiated by a number of pointers added to the corresponding stack.

3. The memory according to claim 1, wherein a state of at least a portion of the data structure is saved by a traversal of nodes in the data structure and wherein the first counter in each traversed node is incremented when the corresponding node is traversed.

4. The memory according to claim 3, wherein a state of at least a portion of the data structure is restored by a traversal of nodes in the data structure and wherein the first counter in each traversed node is decremented if non-zero and, otherwise, if the first counter is zero, a pointer is removed from the corresponding stack and the corresponding node variables are restored to those indicated by the pointer.

5. The memory according to claim 3, wherein a state of at least a portion of the data structure is discarded by a traversal of nodes in the data structure and wherein the first counter in each traversed node is decremented if the first counter is non-zero and, otherwise, if the first counter is zero, a pointer is removed from the stack and discarded.

6. The memory according to claim 1, wherein each of the nodes of the data structure further comprises a flag for indicating whether the corresponding node has been traversed.

7. The memory according to claim 1, wherein the saves to be propagated are propagated by the first counter for a stack at the node being incremented and by the second counter for the stack at descendents of the node being incremented.

8. The memory according to claim 1, wherein a state of at least a portion of the data structure is restored by decrementing the second counter for the stack for a node.

9. The memory according to claim 1, wherein a state of at least a portion of the data structure is discarded by decrementing the second counter for the stack for a node.

10. A method for saving a state of a particular node in a data structure stored in memory for access by a program being executed on a data processing system, the data structure having a plurality of nodes, the nodes representing elements in a set and edges between the nodes representing relationships among the elements and a state of the data structure being defined by states of the nodes and representing a design solution of a physical system, wherein the particular node includes: a current set of variables that define a state of the particular node; and at least one last-in, first-out stack that stores one or more pointers to prior sets of variables for the particular node, the method comprising:
adding a pointer to the stack;
restoring the state of the particular node by removing the pointer from the stack and restoring the node variables to those indicated by the pointer; and
incrementing a counter associated with the stack at the particular node wherein the counter stores a number of saves to be propagated to descendents of the particular node.

11. The method according to claim 10, further comprising saving a state of at least a portion of the data structure by traversing at least some of the nodes of the data structure and, at each of the at least some of the nodes, adding a pointer to a stack at the corresponding node.

12. The method according to claim 10, further comprising discarding a state of the particular node by removing one of the pointers from the stack and discarding the removed one pointer.

13. The method according to claim 10, further comprising propagating saves to descendents of the particular node by incrementing a counter for a stack at a next generation of descendents of the particular node and decrementing the counter for the stack at the particular node.

14. The method according to claim 13, wherein said propagating saves to descendents of the particular node further comprises incrementing a first counter for the stack at the particular node.

15. The method according to claim 13, wherein said propagating saves to descendents of the particular node is performed prior to changing variables of a node in the data structure.

16. The method according to claim 10, wherein each of the nodes of the data structure includes an indicator of whether descendents of the corresponding node include two or more parents of any child node.

17. The method according to claim 10, wherein each of the nodes of the data structure includes an indicator of whether descendents of the corresponding node are only reachable via the corresponding node.

18. A program storage medium readable by a machine, tangibly embodying a program of instructions executable by the machine to perform method steps for saving a data structure state, said method steps including:
traversing a data structure stored in memory, the data structure having a plurality of nodes, wherein each node includes: a current set of variables that define a state of the node; at least one last-in, first-out stack that stores one or more pointers to prior sets of variables for the node; and a first counter associated with each stack, wherein the first counter stores a number of state saves;
for at least some of the nodes, incrementing the first counter; and
providing a second counter in each of at least some of the nodes, wherein the second counter stores a number of state saves to be propagated to descendents of the corresponding node.

19. The program storage medium according to claim 18, said method steps further comprising traversing the data structure and, at each node, decrementing the counter if the counter is non-zero and, otherwise, removing a pointer from the stack and restoring the set of variables to those indicated by the pointer.

20. The memory according to claim 1, wherein at least some of the nodes of the data structure are to be traversed in response to an operation to save a state of the data structure.

* * * * *